US009477694B2

(12) United States Patent
Gkoulalas-Divanis et al.

(10) Patent No.: US 9,477,694 B2
(45) Date of Patent: Oct. 25, 2016

(54) GUARANTEEING ANONYMITY OF LINKED DATA GRAPHS

(71) Applicant: International Business Machines Corporation, Armonk, NY (US)

(72) Inventors: Aris Gkoulalas-Divanis, Adliswill (CH); Spyros Kotoulas, Dublin (IE); Vanessa Lopez, Dublin (IE); Marco Luca Sbodio, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 13/965,870

(22) Filed: Aug. 13, 2013

(65) Prior Publication Data

US 2014/0325666 A1  Oct. 30, 2014

Related U.S. Application Data

(63) Continuation of application No. 13/870,346, filed on Apr. 25, 2013.

(51) Int. Cl.
*G06F 17/30* (2006.01)
*G06F 21/60* (2013.01)
*G06F 21/62* (2013.01)

(52) U.S. Cl.
CPC ......... *G06F 17/30289* (2013.01); *G06F 21/60* (2013.01); *G06F 21/6254* (2013.01)

(58) Field of Classification Search
CPC ............... G06F 17/30958; G06F 17/30289
USPC .................................. 707/800, 803
See application file for complete search history.

(56) References Cited

U.S. PATENT DOCUMENTS

| 6,536,037 | B1 | 3/2003 | Guheen et al. |
| 7,472,105 | B2 | 12/2008 | Staddon et al. |
| 7,512,612 | B1 | 3/2009 | Akella et al. |
| 7,558,791 | B2 * | 7/2009 | Wahl ............... G06F 17/30569 |
| 7,840,542 | B2 | 11/2010 | Betz et al. |
| 8,130,947 | B2 | 3/2012 | Kerschbaum et al. |
| 8,214,401 | B2 * | 7/2012 | Rao .................. G06F 17/30734 |
| | | | 707/794 |

(Continued)

FOREIGN PATENT DOCUMENTS

| EP | 1 193 587 B1 | 7/2012 |
| WO | WO 2010/011747 A1 | 1/2010 |
| WO | WO 2013007525 A1 | 1/2013 |

OTHER PUBLICATIONS

Bhagat et al., "Class-based graph anonymization for social network data," Proceedings of the VLDB Endowment, vol. 2, Issue 1, Aug. 2009, pp. 766-777.

(Continued)

*Primary Examiner* — Miranda Le
(74) *Attorney, Agent, or Firm* — Scully, Scott, Murphy & Presser, P.C.; Kurt Goudy, Esq.

(57) ABSTRACT

A system and computer program product for transforming a Linked Data graph into a corresponding anonymous Linked Data graph, in which semantics is preserved and links can be followed to expand the anonymous graph up to r times without breaching anonymity (i.e., anonymity under r-dereferenceability). Anonymizing a Linked Data graph under r-dereferenceability provides privacy guarantees of k-anonymity or l-diversity variants, while taking into account and preserving the rich semantics of the graph.

13 Claims, 10 Drawing Sheets

(56) References Cited

U.S. PATENT DOCUMENTS

| | | | |
|---|---|---|---|
| 8,316,054 B2* | 11/2012 | El Emam | G06F 17/30536 707/785 |
| 8,346,774 B1 | 1/2013 | Kanevsky et al. | |
| 8,352,403 B2 | 1/2013 | Lee et al. | |
| 8,369,565 B2 | 2/2013 | Shu et al. | |
| 8,438,650 B2* | 5/2013 | Cormode | H04L 63/0421 726/26 |
| 8,682,910 B2* | 3/2014 | Fu | G06F 21/6254 707/688 |
| 8,839,347 B2* | 9/2014 | Boldyrev | H04L 63/20 455/454 |
| 2003/0084339 A1 | 5/2003 | Roginsky et al. | |
| 2008/0162563 A1 | 7/2008 | Gross et al. | |
| 2009/0144255 A1 | 6/2009 | Chow et al. | |
| 2009/0303237 A1 | 12/2009 | Liu et al. | |
| 2010/0054242 A1* | 3/2010 | Oliver | G06F 21/73 370/389 |
| 2010/0077006 A1 | 3/2010 | El Emam et al. | |
| 2010/0268719 A1* | 10/2010 | Cormode | G06F 21/6254 707/756 |
| 2010/0274645 A1* | 10/2010 | Trevithick | G06Q 30/02 705/14.5 |
| 2011/0041184 A1 | 2/2011 | Cormode et al. | |
| 2011/0078143 A1 | 3/2011 | Aggarwal | |
| 2011/0178943 A1* | 7/2011 | Motahari | G06F 21/6254 705/325 |
| 2012/0254362 A1* | 10/2012 | Li | H04W 4/025 709/218 |
| 2012/0297462 A1 | 11/2012 | Peckover | |
| 2013/0124452 A1 | 5/2013 | Arkoudas et al. | |
| 2013/0268357 A1 | 10/2013 | Heath | |
| 2014/0189858 A1* | 7/2014 | Chen | G06F 17/30289 726/22 |
| 2014/0280370 A1* | 9/2014 | Oberle | G06F 8/51 707/803 |

OTHER PUBLICATIONS

Cormode et al., "Anonymizing bipartite graph data using safe groupings," Proceedings of teh VLDB Endowment, vol. 1, Issue 1, Aug. 2008, pp. 833-844.

Liu et al., "Towards identity anonymization on graphs," Proceedings of the 2008 ACM SIGMOND International Conference on Management of Data, SIGMOD '08, Jun. 9-12, 2008, pp. 93-106.

Narayanan et al., "De-anonymizing Social Networks," 30th IEEE Symposium on Security and Privacy, May 17-20, 2009, pp. 173-187.

Machanavajjhala et al., "L-Diversity: Privacy Beyond K-anonymity," ACM Transactions on Knowledge Discovery from Data, vol. 1, No. 1, Article 3, Publication date: Mar. 2007, pp. 1-52.

International Search Report dated Sep. 8, 2014 from related International Application No. PCT/US2014/033261, together with the Written Opinion.

International Search Report dated Nov. 18, 2014, issued in International Application No. PCT/US14/52799.

Aron, "Information Privacy for Linked Data," Massaachusetts Institute of Technology, Thesis submitted to the Department of Electrical Engineering and Computer Science, Dec. 28, 2012, pp. 1-70.

Gkoulalas-Divanis et al., "Revisiting Sequential Pattern Hiding to Enhance Utility," KDD'11, Aug. 21-24, 2011, San Diego, California.

Gkoulalas-Divanis et al., "Association Rule Hiding for Data Mining—Monograph," Springer, Jan. 2010, book, pp. 1-170.

Zhou et al., "A Brief Survey on Anonymization Techniques for Privacy Preserving Publishing of Social Network Data," http://www.time.com/time/magazine/article/0.917.1651513.00.html, Aug. 20, 2007.

Lu et al., "An Inference Control Algorithm for RDF(S) Repository," Proceedings Series: Intelligence and Secutiry Informatics, Pacific Asia Workshop, PAISI 2007, Chengdu, China, Apr. 11-12, 2007.

Natwichai et al., "A Reconstruction-based Algorithm for Classification Rules Hiding," Australian Computer Society, Inc., 17th Australasian Database Conference (ADC2006), Hobart, Australia, Conferences in Research and Practice in Information Technology (CRPIT), vol. 49, Jan. 16-19, 2006.

O'Leary, "Knowledge Discovery as a Threat to Database Security," from The MIT Press Classics Series and AAAI Press: Knowledge Discovery in Databases, Edited by Gregory Piatetsky-Shapiro and William J. Frawley, Dec. 1991.

Oulmakhzoune et al., "Privacy policy preferences enforced by SPARQL Query Rewriting", 2012 Seventh International Conference on Reliability and Security (ARES), Aug. 20-24, 2012, pp. 335-342.

Parmar et al., "Blocking based approach for classification Rule hiding to Preserve the Privacy in Database", 2011 International Symposium on Computer Science and Society (ISCCS), Jul. 16-17, 2011, pp. 323-326.

Zheleva et al., "Preserving the Privacy of Sensitive Relationships in Graph Data", Proceeding PinKDD'07 Proceedings of the 1st ACM SIGKDD International Conference on Privacy, security, and trust in KDD, Aug. 12, 2007, pp. 153-171.

US Official Action dated May 6, 2015 from related U.S. Appl. No. 14/143,923.

* cited by examiner

GUARANTEEING ANONYMITY OF LINKED DATA GRAPHS

CROSS-REFERENCE TO RELATED APPLICATIONS

The present invention claims the benefit of the filing date of commonly-owned, co-pending U.S. patent application Ser. No. 13/870,346 filed Apr. 25, 2013, the entire contents and disclosure of which is incorporated by reference as if fully set forth herein.

FIELD

The present disclosure generally relates to a system that guarantees anonymity of Linked Data graphs, and particularly one that guarantees semantics-preserving anonymity under r-dereferenceability for a Linked Data graph.

BACKGROUND

Linked Data is increasingly used in the Web, both by governmental and business organizations. Linked Data is a way to publish data using standard Web technologies (HTTP and URI), and to leverage the expressiveness of the Semantic Web (Linked Data is encoded using Resource Description Framework (RDF), commonly used to describe Linked Data graphs). A Linked Data graph G is published (using RDF) as web data and is accessible via a browser.

The key differentiating strengths of Linked Data are (1) the well-defined semantics allowing automated reasoning (ability to infer new data from existing one), and (2) the implicitly interlinked nature of the information.

In the Linked Data world, data is represented by entities with formally defined semantics: each entity has a set of properties, and a property can connect two entities or an entity to a value of a defined data type. The resulting underlying data structure is a directed labeled graph, where nodes represent entities, and edges represent properties. Entities and properties are typically uniquely identified by Uniform Resource Identifiers (URIs).

URIs can be dereferenced. Dereferencing consists essentially of an HTTP GET operation, which retrieves additional information about the data (entity or property) identified by the URI being dereferenced.

Well-defined semantics and URI dereferenceability makes Linked Data graphs unique with respect to traditional relational data and graph data. These two characteristic aspects of Linked Data makes it possible for a software program to automatically augment a given Linked Data graph with new information, either by inferring it from the semantics of the graph (through inference) or by retrieving it from the Web (by dereferencing URIs). In such a scenario, it is particularly challenging to guarantee anonymity of potentially sensitive information published as a Linked Data graph.

Existing anonymization techniques work well either on relational data or graph structures (including social network graphs).

Given a set of quasi-identifying properties of the data, traditional anonymization techniques guarantee k-anonymity, that is for each combination of values of the quasi-identifying properties there are at least k entities having that combination of values (forming an equivalence class) or none. If a sensitive property is also given as input, existing techniques can also guarantee l-diversity, which ensures k-anonymity and also that in each equivalence class there are at least l well represented values for the sensitive property. There are also different variants of l-diversity, for example t-closeness, which ensures a distance no larger than a threshold t between the distribution of the values of the sensitive property in the overall data and in any equivalence class.

On the other side, existing anonymization techniques for graphs usually modify the graph structure either by changing the degree of a node, or by coarsening the graph (replace nodes in a neighborhood with a single node). Finally, some graph anonymization techniques also exploit specific properties of the graph structure.

There are also anonymization techniques specifically designed for social networks. One approach consists of adding some "noise" in the graph by inserting additional edges or removing edges, with the purpose of preventing attacks based on background knowledge about some neighborhood in the graph (i.e. exploiting the degree of the nodes). Another approach combines k-anonymity with edge generalization, but assumes that edges (properties) have the same meaning.

BRIEF SUMMARY

There is provided a system, method and computer program product for solving the problem of anonymizing a Linked Data graph (providing k-anonymity or l-diversity variants) while taking into account and preserving its rich semantics.

The system, method and computer program product, at the same time, ensures that the anonymity is not breached when the Linked Data graph is expanded up to certain number of times by dereferencing its URIs (r-dereferenceability).

By guaranteeing anonymity under r-dereferenceability in a Linked Data graph, the method and system ensures that by dereferencing URIs in the anonymized Linked Data graph up to r times, the anonymity is preserved (r-dereferenceability).

Further, the method and system guarantees anonymity (k-anonymity or l-diversity variants) by changing the original values of a computed set of properties (Q) in the Linked Data graph based on the output of an anonymization (e.g., suppressing or masking) algorithm.

Further, the method and system guarantees semantic consistency of the anonymized Linked Data graph by providing appropriate ontology definitions of the properties in Q according to their new values.

The computation of the set of properties Q takes into account the semantics of the original Linked Data graph, wherein Q includes the quasi-identifying properties given as input and other properties that are inferred to be equivalent to (i.e., the same) or subsumed by properties in the input set P.

The new ontology definitions of the properties in Q are provided to reflect the use of equivalence classes in the anonymized Linked Data graph, and to keep consistency in the anonymized Linked Data graph. This way, the produced, anonymous Linked Data graph is directly query-able.

Thus, in one embodiment, there is provided a method to guarantee anonymity under r-dereferenceability in a Linked Data graph comprising: transforming an original Linked Data graph structure having labelled nodes interconnected by directed edges into a corresponding anonymous Linked Data graph, with one or more nodes embodying a searchable Uniform Research Indicator (URI); iteratively expanding the corresponding anonymous Linked Data graph up to r times, where r is an integer, wherein in each expansion additional information nodes embodied by additional URIs and property values are added to the anonymized Linked Data graph nodes; determining from each of the additional URIs and property values in the expanded corresponding anonymous Linked Data graph whether anonymity is breached, and making a URI determined as breaching the anonymity non-dereferenceable, wherein a computing system including at least one processor unit performs one or more of: the transforming, iteratively expanding, determining and the dereferencing.

In a further embodiment, there is provided a system to guarantee anonymity under r-dereferenceability in a Linked Data graph comprising: a memory storage device; a processor unit in communication with the memory storage device and configured to perform a method to: transform an original Linked Data graph structure having labelled nodes interconnected by directed edges into a corresponding anonymous Linked Data graph, with one or more nodes embodying a searchable Uniform Research Indicator (URI); iteratively expand the corresponding anonymous Linked Data graph up to r times, where r is an integer, wherein in each expansion additional information nodes embodied by additional URIs and property values are added to the anonymized Linked Data graph nodes; determine from each the additional URIs and property values in the expanded corresponding anonymous Linked Data graph whether anonymity is breached, and making a URI determined as breaching the anonymity non-dereferenceable.

A computer program product is provided for performing operations. The computer program product includes a storage medium readable by a processing circuit and storing instructions run by the processing circuit for running a method. The storage medium readable by a processing circuit is not only a propagating signal. The method is the same as listed above.

BRIEF DESCRIPTION OF THE SEVERAL VIEWS OF THE DRAWINGS

The objects, features and advantages of the present invention will become apparent to one of ordinary skill in the art, in view of the following detailed description taken in combination with the attached drawings, in which.

DETAILED DESCRIPTION

Linked Data is a popular way of publishing data on the Web. In Linked Data, entities are uniquely identified with HTTP URIs (unique resource identifiers), so that people can look up those names in the Web (simply by dereferencing the URI over the HTTP protocol). Entities are linked to other entities through relationships. Therefore, Linked Data can be seen as a directed labeled graph-based data model, which encodes data in the form of subject, predicate, object triples. The predicate (or property) specifies how the subject and object entities (or resources) are related, and is also represented by a URI. A common serialization format for Linked Data is RDF/XML. The Resource Description Framework (RDF) is a standard model that enables Web publishers to make these links explicit, and in such a way that RDF-aware applications can follow them to discover more data. Linked Data practices have been adopted by an increasing number of data providers, resulting in the creation of a global data space on the Web including billions of RDF triples. Thus, Linked Data provides a novel and important scenario to apply privacy and anonymization techniques.

The present disclosure provides a system, method and computer program product for solving the problem of anonymizing a Linked Data graph (providing k-anonymity or l-diversity variants) while taking into account and preserving its rich semantics, and, at the same time, ensuring that the anonymity is not breached when the Linked Data graph is expanded up to certain number of times by dereferencing its URIs (r-dereferenceability).

Figure 1:
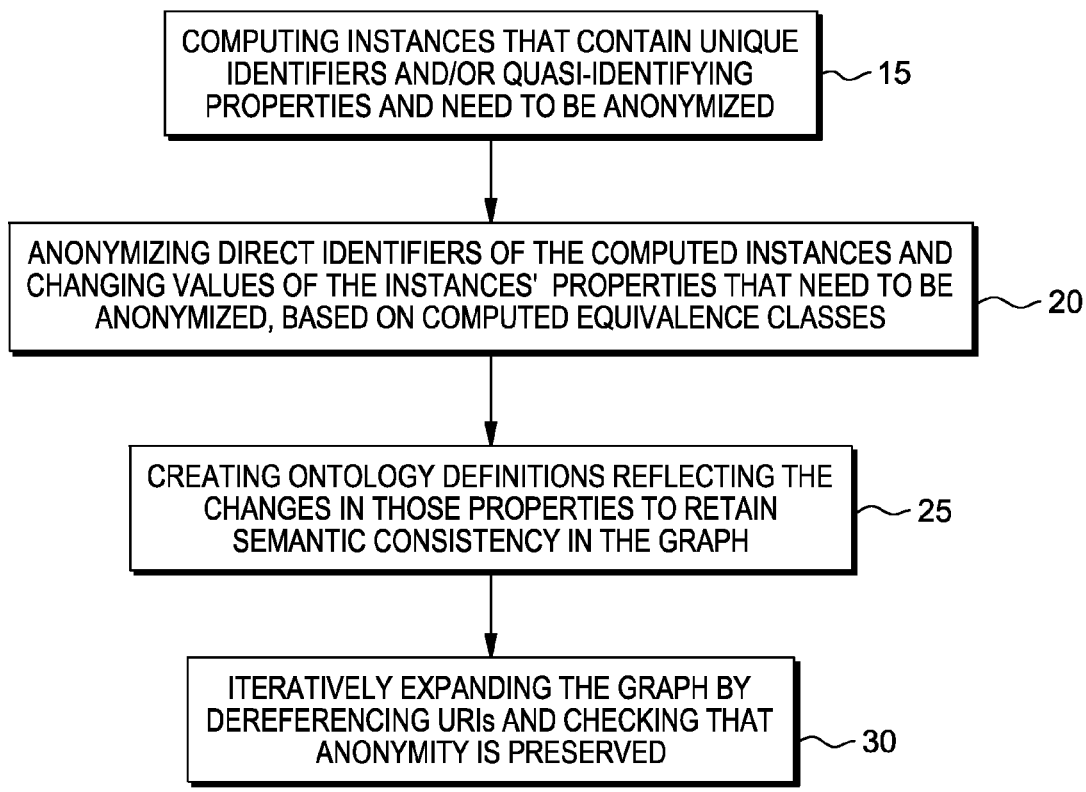
FIG. 1 illustrates a general process for providing k-anonymity under r-dereferenceability for a Linked Data graph in one embodiment.

FIG. 1 illustrates a general process 10 for providing anonymity under r-dereferenceability, and particularly, guaranteeing anonymity (using k-anonymity or l-diversity variants) under r-dereferenceability for a Linked Data graph. The method 10 includes: 1. At 15, computing instances that contain direct identifiers and/or quasi-identifying properties and/or sensitive properties, and need to be anonymized; 2. In FIG. 1, at 20, anonymizing direct identifiers of the computed instances and changing values of instances' quasi-identifying properties, based on computed equivalence classes; 3. At 25, creating ontology definitions reflecting the changes in those properties to retain semantic consistency in the graph; and 4. At 30, iteratively expanding the graph by dereferencing URIs up to r times, checking at each expansion if anononymity is preserved, and if not, preventing that expansion path by making URIs non-dereferenceable.

Figure 2:
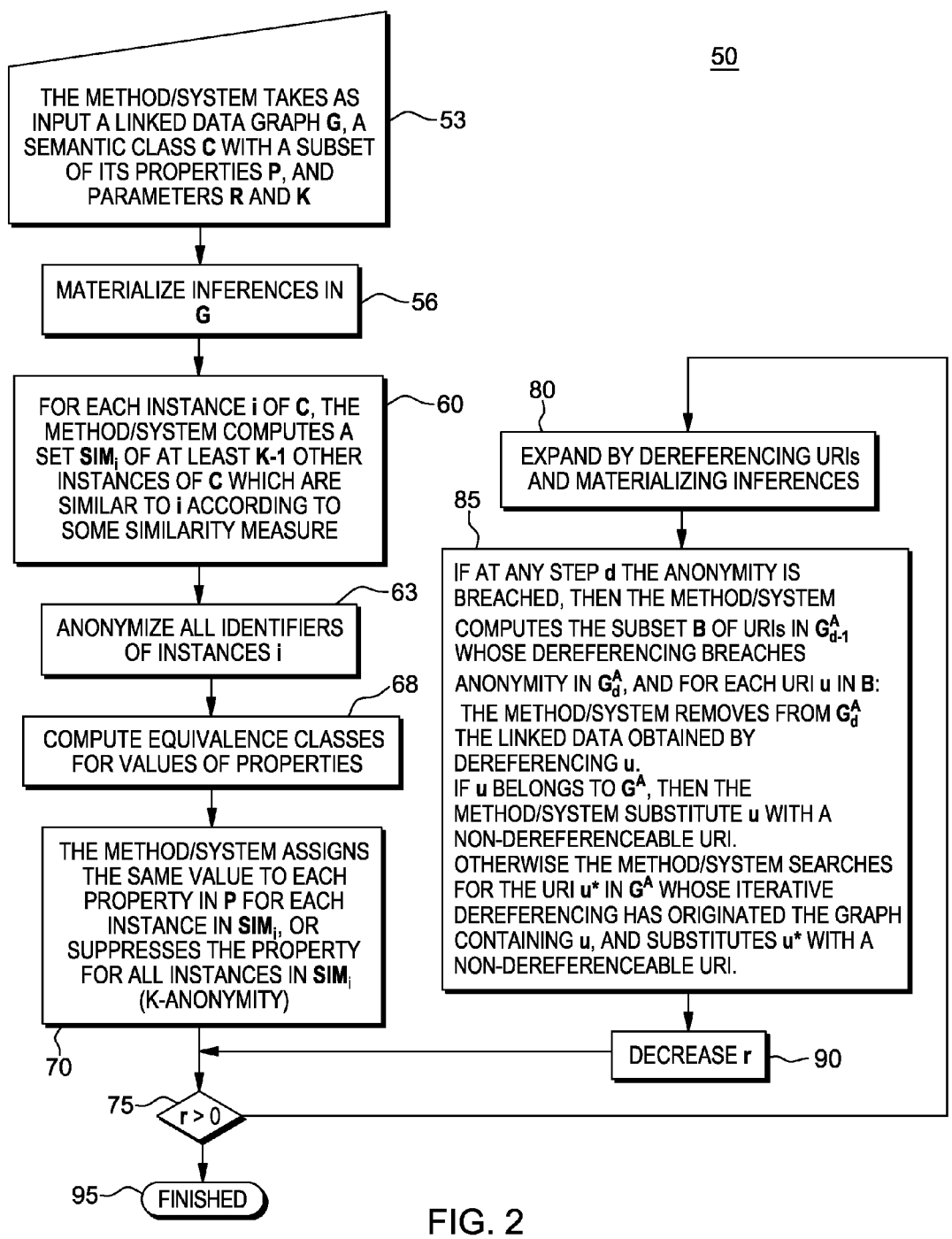
FIG. 2 shows a computer-implemented process for automatically solving the problem of anonymizing a Linked Data graph (providing k-anonymity variant)

FIG. 2 shows a more detailed computer-implemented process 50 for automatically solving the problem of anonymizing a Linked Data graph (providing k-anonymity or l-diversity variants) while taking into account and preserving its rich semantics, and at the same time, ensuring that the anonymity is not breached when the Linked Data graph is expanded up to certain number of times (r) by dereferencing its URIs (r-dereferenceability)

As shown at 53, a first step receives (or accesses) inputs to the system. These inputs comprise data including: a Linked Data graph G, a (semantic) class C whose instances must be protected in the graph, an input set of properties P of C (quasi-identifying attributes), an input parameter value k for k-anonymity, and an input parameter value r for r-dereferenceability. As the method further guarantees l-diversity, then a further input includes a sensitive property, and the value l for l-diversity.

Next, as shown at 56, FIG. 2, the method includes materializing inferences in the Linked Data graph G. Step 56 includes analyzing the Linked Data graph to produce all inferences, i.e., indirect relations that can be extracted from the graph nodes and their topology. For example, in a portion of an example Linked Data graph 100 shown in FIG. 3A, a node 101 representing an entity John Smith as being linked via a "same as" property edge 102 to a node 103 having a value "J. Smith". The node 103 for J. Smith in turn, is linked via "gender" property edge 104 to a node value "male". Thus, at this step, analyzing will automatically deduce from the graph that entity John Smith is a male. Such indirect inferences may be extracted through the inference materialization process and stored by the system. Alternatively, the inferences may be extracted as required by 60, instead of being pre-computed.

In one embodiment, the inference process may be performed either by an RDF store (i.e. an information/knowledge management system capable of handling RDF data) with inferencing capability or by using off-the-shelf semantic reasoning algorithms (i.e. algorithms to perform automatic inference from a set of asserted facts or axioms). Inference results in a graph similar to the original one, with more information. The check described herein below of whether the anonymity is breached is performed in exactly the same way as without inference.

Referring back to FIG. 2, as shown next at 56, the method computes instances I and properties Q to protect. Since a Linked Data graph G, such as example Linked Data graph 100 shown in FIG. 3A, has well defined semantics (defined by one or more ontologies), the method, as instructed by a software program running on a computer system, performs automated reasoning over the graph and infers new data. Inference may be taken into account during the anonymization process, because it can expand the set of instances/properties that need to be protected. More precisely, the set of Instances I to be protected is given by the union of:

Set A: Instances of the given class C which, after inference, will explicitly include equivalent instances (those link through the property "sameAs"), instances of equivalent classes, and instances whose inferred type is the given class or any equivalent class; and Set B: Instances connected through an inverse functional property to any instance in A.

Further, the set of properties Q includes all the properties of instances I that after materialization are inferred to be equivalent to any property given in the input set P. In one example implementation (FIG. 2 step 60), for each instance i of C, the method/system computes a set $Sim_i$ of at least k−1 (where k is the input k parameter representing the k-anonymity) other instances of class C which are "close to" (similar to) instance i according to a similarity measure S. This similarity measure may be application dependent—it is a function used to group together individuals having a certain property. For example, the applied similarity measure S may indicate that instance i (having a value of quasi-identifying property "age" equal to 20) is more similar to instance j that has a value of property "age" equal to 25, than to instance k that has a value of property "age" equal to 80. Similarity measures can also extend to more than one quasi-identifying property, essentially measuring how similar two instances are based on their values for a set of quasi-identifying properties. Several implementations of different similarity measures can be applied to the method. If k-anonymity is sought, $Sim_i$ may contain the (at least) k−1 most similar instances to instance i given the similarity measure S. If l-diversity is sought, $Sim_i$ will contain at least k−1 instances that are similar to each other based on S and also adhere to the l-diversity requirement. After computing $Sim_i$ the method produces an equivalence class for the instances in $Sim_i$ so that these instances can be anonymized together. The same process is repeated for the rest of the instances in I, thereby producing a partitioning of the instances in I into equivalence classes. In one embodiment, when considering instances of C and properties in P, the method/system includes also the semantically-equivalent instances and properties, which are computed through inference. An RDF reasoner algorithm (not shown) may perform inference in G to expand the Linked Data graph to include semantically equivalent instances and properties.

Next, as shown at 63, FIG. 2, the method anonymizes all direct identifiers of instances I.

In this step, all direct identifiers that are associated with instances of class C in the graph, are sanitized. Direct identifiers are properties that can be uniquely associated to an instance of the class (e.g., names, social security numbers (SSNs), credit card numbers, etc.), and can thus be used by adversaries to re-identify individuals. In this step, these identifiers are either suppressed (i.e. removed) or properly masked.

Next, as shown at 68, FIG. 2, anonymization algorithms may be used to generate equivalence classes, and at 70, the values of the properties in Q are changed using the computed equivalence classes. In one embodiment, there are two cases:

Generalizations; the value of a property in Q is changed to a more general class than the original value. Since a Linked Data graph has well defined semantics, the generalization is performed by using a super-class S of the class corresponding to the original value. To preserve semantic consistency, the method includes creating a new ontology definition for the property specifying the super-class S as the new range; and Ranges; in which one of the following strategies may be implemented: 1) Multiple values; 2) Intervals.

Multiple values: given an instance, besides the original value that this entity has for a quasi-identifying property q in Q in the graph, there are added multiple other values that property q may have for the corresponding entity. To preserve semantic consistency, the method further creates a new ontology definition of the property with appropriate cardinality. If the original domain of the property q includes disjoint subclasses, then, in the new ontology definition, the disjointness restriction for the subclasses is removed.

As an example, in the case of multiple values, the constraint denoting that in the corresponding Linked Data graph a class "Person" has one and only one age is removed; instead a constraint is added that says that, in this Linked Data graph, a class "Person" may have up to three ages (one of which is correct); this can be done for example by using an OWL (Web Ontology Language) cardinality restriction on the property.

Intervals: instead of using a single value for a property q, an interval that contains this value may be used. To preserve semantic consistence, an ontology definition for a class Interval is created having the two properties minimum and maximum. A new ontology definition for the property q is created specifying the class Interval as the new range.

In the case of intervals, a class defining the notion of "interval" is introduced in the ontology (for example, a class "Interval" with properties "minimum" and "maximum"), and then specifying that the range of the property "hasAge" is "Interval" (instead of a single integer number).

In the next steps of the process, the values of the properties in Q are adjusted so as to be the same for the individuals of each computed group (i.e. equivalence class) and the ontology is updated so that the resulting Linked Data graph remains semantically consistent. At this point the Linked graph is protected.

Thus, returning to FIG. 2 at 68, the method computes equivalence classes E for values of properties Q in a manner that guarantees anonymity.

To protect the linked data from re-identification attacks, the privacy principle of k-anonymity is used. k-anonymity protects individual entities from re-identification attacks by forming groups (known as equivalence classes) of at least k members. The grouping is performed in a way that all individuals in a group share similar values for a set of properties Q which, in combination, are considered as background knowledge of attackers who want to perform re-identification attacks. As an example, consider the properties 5-digit zip code, date of birth, gender that are associated with instances of class C in the Linked Data graph. This combination of values has been proven to be fairly unique. In the United States, about ~87% of individuals were shown (in a research study) to have a unique combination of these demographics, thus are susceptible to re-identification attacks. Assuming that Q={5-digit zip code, date of birth, gender}, there is generated equivalence classes in a way that in each class there are at least k individuals with similar values for these properties. Then, all individuals of a group are assigned the same values for these properties, thus become indistinguishable from one another based on attributes R. This is achieved through data suppression or data generalization.

As will be explained in greater detail, properties in set P are generalized or suppressed based on the actual anonymity algorithm that is enforced. In the case of generalization, crisp values become abstract so that different instances become indistinguishable from one another (e.g., ages 20 and 25 are generalized to a group age interval ranging from 20 to 25). In the case of suppression, selected values of property Q are suppressed from selected instances. The suppression (deletion) increases the uncertainty of the actual value of the property for the individual, hence it protects the individual's privacy (e.g., ages 20 and 25 are suppressed so an adversary that has background knowledge on the age of an individual cannot use this information to re-identify the individual in the released data).

Then, returning to FIG. 2, at 70, the method/system iteratively performs, for each property R, changing the value of the property in graph G using equivalent classes in E; and providing a new ontology definition accordingly (e.g., range). In one embodiment, the method assigns the same value to each property in P for each instance in $Sim_i$, or suppresses the value of the property for all instances in $Sim_i$ (k-anonymity). That is, at step 70, for each property q in Q, a value in G is changed using E including, for example, generalization by changing the value of q to a super-class of the original value (according to the ontology), and creating a new consistent ontology definition for q to define its new range. Further, a value in graph G is changed by implementing one of the range strategies, e.g., multiple value or interval. The method performs for multiple value range: creating multiple instances of property q pointing to different values including the original one; and creating a new ontology definition for q having an appropriate cardinality. If the original domain of q includes disjoint classes, then the disjointness must be removed or a different property generated. The method performs for interval range: changing the value of q to an instance of class "Interval" having a minimum and maximum property; adding the class Interval, if it is not already defined; and creating a new ontology definition for q to define its new range.

Figure 3A:
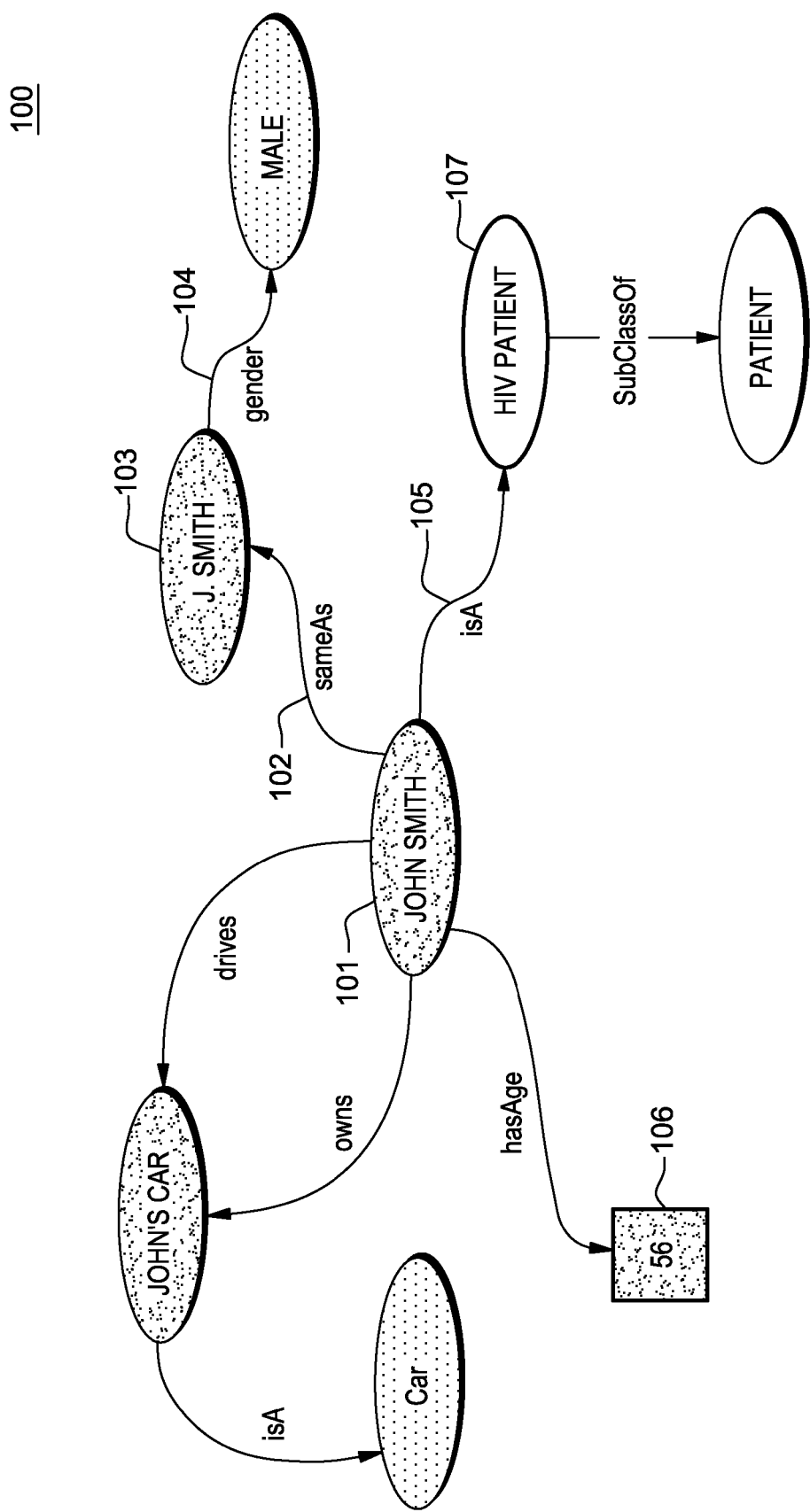
FIG. 3A depicts an example of an initial Linked Data graph prior to anonymization.
Figure 4:
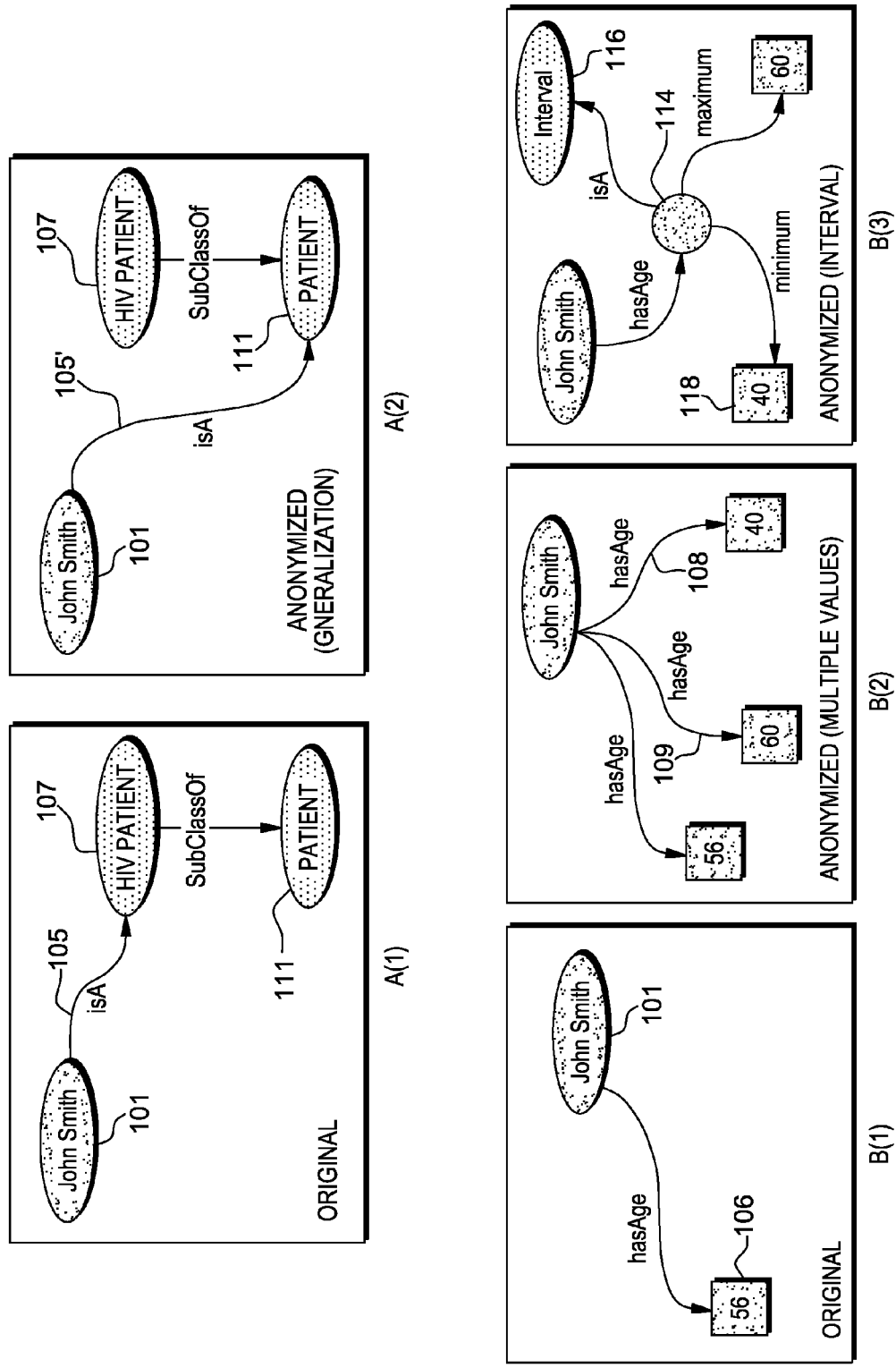
FIGS. 4A(1) and 4A(2) depict an example of generalization, where the value of a property is generalized (abstracted) by an anonymization technique.
FIGS. 4B(1)-4B(3) depict two examples of generalization, where the original value of a property in an entity is replaced with a set of individual values (FIG. 4B(2)) for this property or with a range of values (FIG. 4B(3)), used to anonymized the corresponding entity.

FIG. 4 illustrates examples of the generalization and ranges techniques for anonymization performed on the Linked Data graph 100 of FIG. 3A. FIG. 4A(1) shows the changing values of properties using generalization which, in this example, involves changing the value of an entity's "isA" property to cover a superclass of "HIV Patient". That is, the example generalization includes identifying an instance John Smith at node 101 is an "isA" property of a class "HIVPatient" represented by node 107, where HIV-Patient node 107 is a sub-class of a "Patient" class represented by node 111. In this example, shown in FIG. 4A(2), the John Smith node 101 being an "isA" is anonymized by changing the "isA" relation modifying the John Smith node 101 to relate to an instance of its superclass Patient node 111 via a re-directed link 105'. For the purposes of this example it is assumed that superclass "Patient" contains more than k patients, while class "HIVPatient" contains less than k patients.

FIG. 4 shows further changing values of properties using ranges. For example, in FIG. 4B(1) there is illustrated an example of the ranges technique for anonymization where initially, the instance—John Smith node 101 is linked by a "hasAge" relation to a property value represented by a node 106 indicating an age (e.g., 56). In FIG. 4B(2) anonymization includes changing the value of the property to multiple values. For instance, in FIG. 4, the John Smith age property at node 106 becomes linked to several values of age by adding further "hasAge" links 108 and 109 from the John Smith node 101 to link to respective two other nodes (e.g., representing property "has Age" values 40 and 60). Further, rather than forming additional links to new property values, alternatively, in FIG. 4B(3) anonymization may include modifying the "John Smith" node 101 to link to an "interval" class node 116 by modifying the John Smith node 101 to link to a node 114 that relates to the interval class node 116 by an "isA" property link. The node 114 linked to an interval becomes further linked to a minimum value node 118 (e.g., representing a lower limit anonymized age value "40" of the interval), and is further linked to a maximum value node 119 (e.g., representing an anonymized upper limit age 60 of the interval) providing anonymity, for instance "John Smith's" age in the example Linked Data graph 100 of FIG. 3A.

For the example processing of anonymizing of all identifiers of instances as shown in the graph 100 of FIG. 3A, example initialized RDF/OWL code corresponding to the definitions is provided. For the example Linked Data graph 100 of FIG. 3A, an initial definition for the RDF ontology "Ontology01.owl" is, for example:

"http://www.example.com/ontologies/Ontology01.1.owl is an rdf:type owl:Ontology"

This location includes the original ontology definition for the property "hasAge," a data property, shown, for example, in RDF as:

---

"http://www.example.com/ontologies/Ontology01.owl#hasAge"
:hasAge rdf:type owl:DatatypeProperty ;

-continued

```
    rdfs:domain :Person ;
    rdfs:range xsd:integer .
```

This location further includes the initial RDF ontology definition for a class "HIVPatient" a class, shown, for example, in RDF as:

```
"http://www.example.com/ontologies/Ontology01.owl#HIVPatient"
:HIVPatient rdf:type owl:Class ;
    rdfs:subClassOf :Patient .
```

This location further includes the initial ontology definitions for class "Patient," a class, shown, for example, in RDF as:

```
"http://www.example.com/ontologies/Ontology01.owl#Patient"
:Patient rdf:type owl:Class ;
    rdfs:subClassOf :Person .
```

This location further includes the initial ontology definition for class "Person," a class, shown, for example, in RDF as:

```
"http://www.example.com/ontologies/Ontology01.owl#Person"
Person rdf:type owl:Class ;
    rdfs:subClassOf [ rdf:type owl:Restriction ;
        owl:onProperty :hasAge ;
        owl:qualifiedCardinality "1"^^xsd:nonNegativeInteger ;
        owl:onDataRange xsd:anyURI
    ] .
``` and the original RDF ontology definition of John Smith, an instance of class "Person", with the original value of property hasAge (i.e. 56) is in RDF as:

```
"http://www.example.com/ontologies/Ontology01.owl#JohnSmith"
:JohnSmith rdf:type :HIVPatient ;
    :hasAge 56 .
```

It is noted that the definition of class Person requires that each individual of this class (or its sub-classes) has only one property hasAge (cardinality restriction).

After the processing of anonymizing all identifiers of instances in the manner as described herein with respect to FIGS. 4A and 4B resulting in the anonymized graph of FIG. 3B, example resulting RDF/OWL code including a modified version of the ontology Ontology01.1.owl, and the modified definition of John Smith with 3 values for the property "has Age" (after the anonymization), is defined as follows:

```
http://www.example.com/ontologies/Ontology01.1.owl#JohnSmith
:JohnSmith rdf:type :Patient ;
:hasAge 40 , 56 , 60 .
```

Figure 3B:
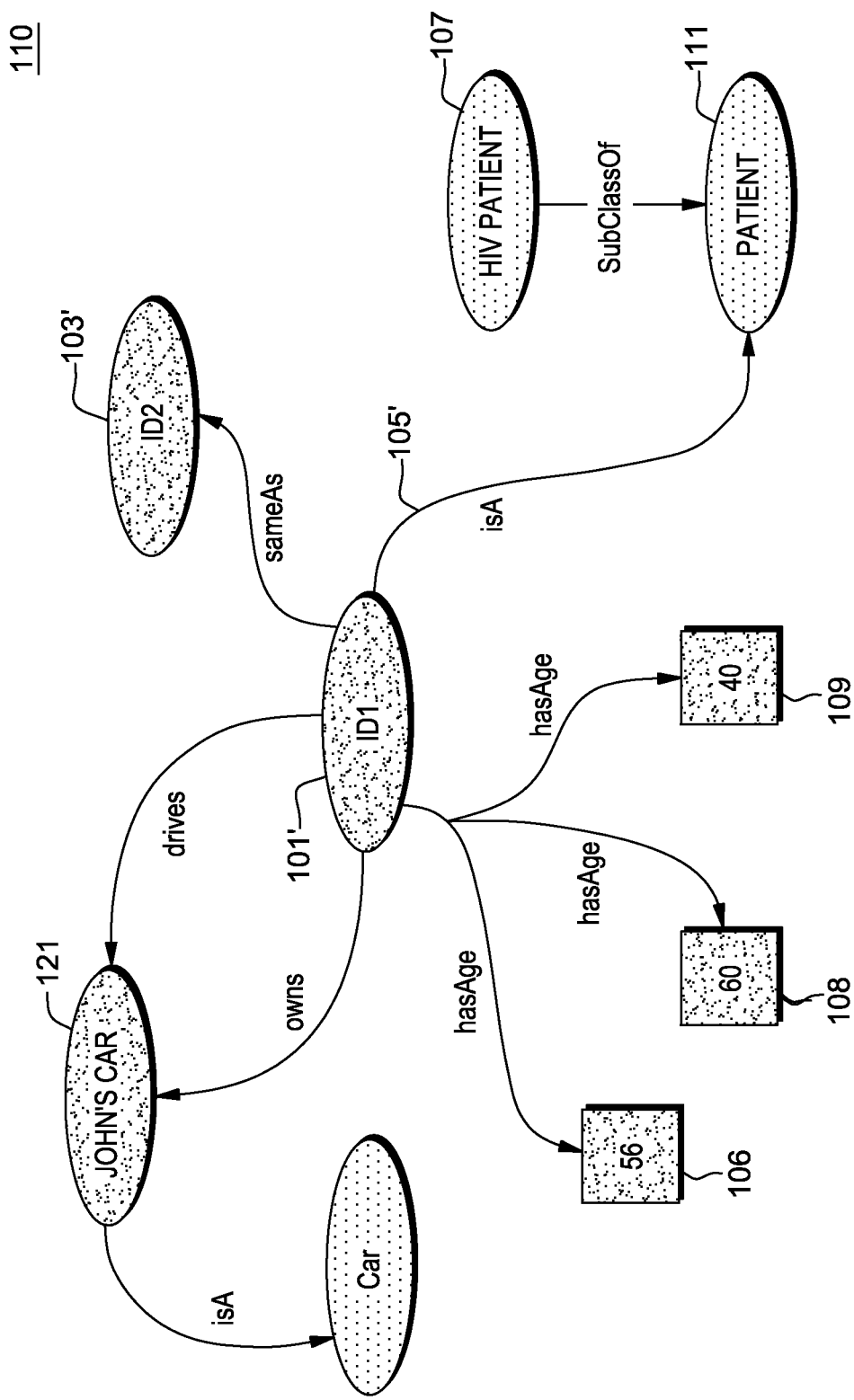
FIG. 3B depicts an example of anonymizing the Linked Data graph of FIG. 3A.

For example, in RDF, the modified "has Age" data property for this example of FIG. 3B is now:

```
"http://www.example.com/ontologies/Ontology01.1.owl#hasAge"
    :hasAge rdf:type owl:DatatypeProperty .
```

The resulting modified "class" definitions for HIVPatient, Patient and Person in this example of FIG. 3B is now:

```
"http://www.example.com/ontologies/Ontology01.1.owl#HIVPatient"
:HIVPatient rdf:type owl:Class ;
    rdfs:subClassOf :Patient .
"http://www.example.com/ontologies/Ontology01.1.owl#Patient"
:Patient rdf:type owl:Class ;
    rdfs:subClassOf :Person .
"http://www.example.com/ontologies/Ontology01.1.owl#Person"
:Person rdf:type owl:Class ;
    rdfs:subClassOf [ rdf:type owl:Restriction ;
        owl:onProperty :hasAge ;
        owl:minQualifiedCardinality
            "3"^^xsd:nonNegativeInteger ;
        owl:onDataRange xsd:anyURI
    ] .
```

The resulting modified RDF definition of individual John Smith having 3 values for the property has Age (after the anonymization in FIG. 3B) is now:

```
"http://www.example.com/ontologies/Ontology01.1.owl#JohnSmith"
:JohnSmith rdf:type :Patient ;
    :hasAge 40,
        56 ,
        60 .
```

This it is noted that the definition of the class Person had to be changed in the ontology to assure semantic consistency, and now such definition requires that each instance of this class (or its sub-classes) have at least 3 properties hasAge.

As anonymizing the identifiers of instances, and/or changing the value of properties is still not sufficient to guarantee the anonymity of a Linked Data graph (because URI dereferenceability allows for expanding the graph itself with new data that can breach anonymity), the method includes iteratively dereferencing URIs in the anonymized Linked Data graph $G^A$ up to r times (where r is the input parameter).

That is, as shown at 75-90, FIG. 2, at each iteration, the method expands the Linked Data graph with new data originated by dereferencing each currently dereferenceable URI u in the graph (i.e. each URI for which a dereferencing operation has not taken place), and obtaining an expanded graph. Thus, beginning at step 75, FIG. 2, a first check is made to determine if all the specified r iterations have been performed, i.e., a determination is made as to whether r>0. If r=0, the last iteration has been performed and the method ends at 95. Otherwise, while r>0 the process proceeds to step 80 where the graph is expanded by dereferencing all current URIs that have not been dereferenced yet and computing inference.

An expansion of each URI of the graph (r=1) is performed and a check is made as to whether the new information that is incorporated to the graph breaches anonymity. This same process is repeated up to r times (where r is a user-specified integer) and the resulting (further expanded) graphs are checked for introducing privacy breaches. If at any point a privacy breach occurs after dereferencing a URI, the URI is rendered non-dereferenceable (i.e. the graph is prevented from being further expanded through this URI). The result of the process is a graph that can be expanded up to r times and remains anonymous (privacy-protected).

Thus, step 80 includes computing the inference materialization on the expanded graph, and then checking if the anonymity is breached. If it is determined that anonymity is breached, then the expansion originated by dereferencing URI u is removed at 85. This includes, determining if u is a URI in the original graph, in which case this URI u is made non-dereferenceable (i.e. it is replaced by a generated URI that is not de-referenceable or provides an empty result if it is dereferenced). Otherwise, a URI u* is searched in the original graph whose iterative dereferencing has originated the graph containing u, and that URI u* is made non-dereferenceable.

More detailed processing at step 85, FIG. 2 includes: Determining if at any step d whether the anonymity is breached. If detected that anonymity is breached then the method/system computes the subset B of URIs in graph $G_{d-1}^A$ whose dereferencing breaches anonymity in $G_d^A$, and for each URI u in B: The method/system removes from $G_d^A$ the Linked Data obtained by dereferencing u. If u belongs to $G^A$, then the method/system substitutes u with a non-dereferenceable URI. Otherwise the method/system searches for the URI u* in $G^A$ whose iterative dereferencing has originated the graph containing u, and substitutes u* with a non-dereferenceable URI.

Continuing at 90, the dereferenceability parameter r (index) is decremented and the process returns to 75, to determine if all r iterations have been performed, i.e., is processing finished, in which case the process ends at 95. Otherwise, the graph is expanded again by returning to step 80.

It should be understood that, in the embodiments described herein, values for specified input parameter k (in k-anonymity), may vary as this is usually domain-specific. For example, in medical data anonymization the value of k may be 3 or 5 (i.e. corresponding to a maximum allowable re-identification probability of 33.33% or 20%, respectively). Regarding the value of specified input parameter r for r-dereferenceability, it also depends on the application and on the size of the original graph G. Larger values of r would generate more informative graphs, as more information would be published (in a privacy-preserving way).

FIGS. 3A-3E depicts an illustrative example of r-dereferenceablity in a generated Linked Data graph. FIG. 3A first shows an example initial Linked Data graph G 100 that is not anonymized and including highlighted nodes 106, 107 representing sensitive information. Applying the generalization and property anonymization techniques as described herein with respect to FIG. 4 results in an initial anonymized graph $G^A$ 110 as shown in FIG. 3B.

That is, as an ontology contains a hierarchy of classes, for each class it is possible to identify its super-class, and its sub-classes (if any). Generalization using super-classes is formed exploiting this hierarchy. For example, FIG. 3B illustrates if an ontology for the medical domain defines that the class "HIVPatient", represented by node 101 is a sub-class of "Patient" represented by node 105, and it is known that "John Smith" is an instance of "HIVPatient", then this is generalized by saying that "John Smith" is an instance of "Patient" as indicated by new link 304. Note: a similar approach can be applied to properties, because an ontology can also define a hierarchy of properties. As a further generalization for anonymity, the nodes 102 and 103 representing respective entities John Smith and J. Smith have been replaced (masked) with new values id1 and id2, respectively.

New ontology definitions may be necessary when the anonymization of a property changes its range. For example (see FIG. 3A), an ontology may define the property "hasAge", and specify that its range is the set of integer numbers, and that a "Person" has one and only one age. So, there may be an RDF graph providing the information that "John Smith" "hasAge" "56". When the graph is anonymized, it may be decided to associate "John Smith" with multiple values by having several "hasAge" properties such as indicated by added links pointing to respective new values 106, 107, or it may be decided to associate "John Smith" with an age interval instead of a specific number. In these cases, the ontology definition of the property "hasAge" is changed to preserve semantic consistency between the RDF graph and the ontology. For example, by specifying that the range of the property "hasAge" is "Interval" (instead of the set of integer numbers).

Figure 3C:
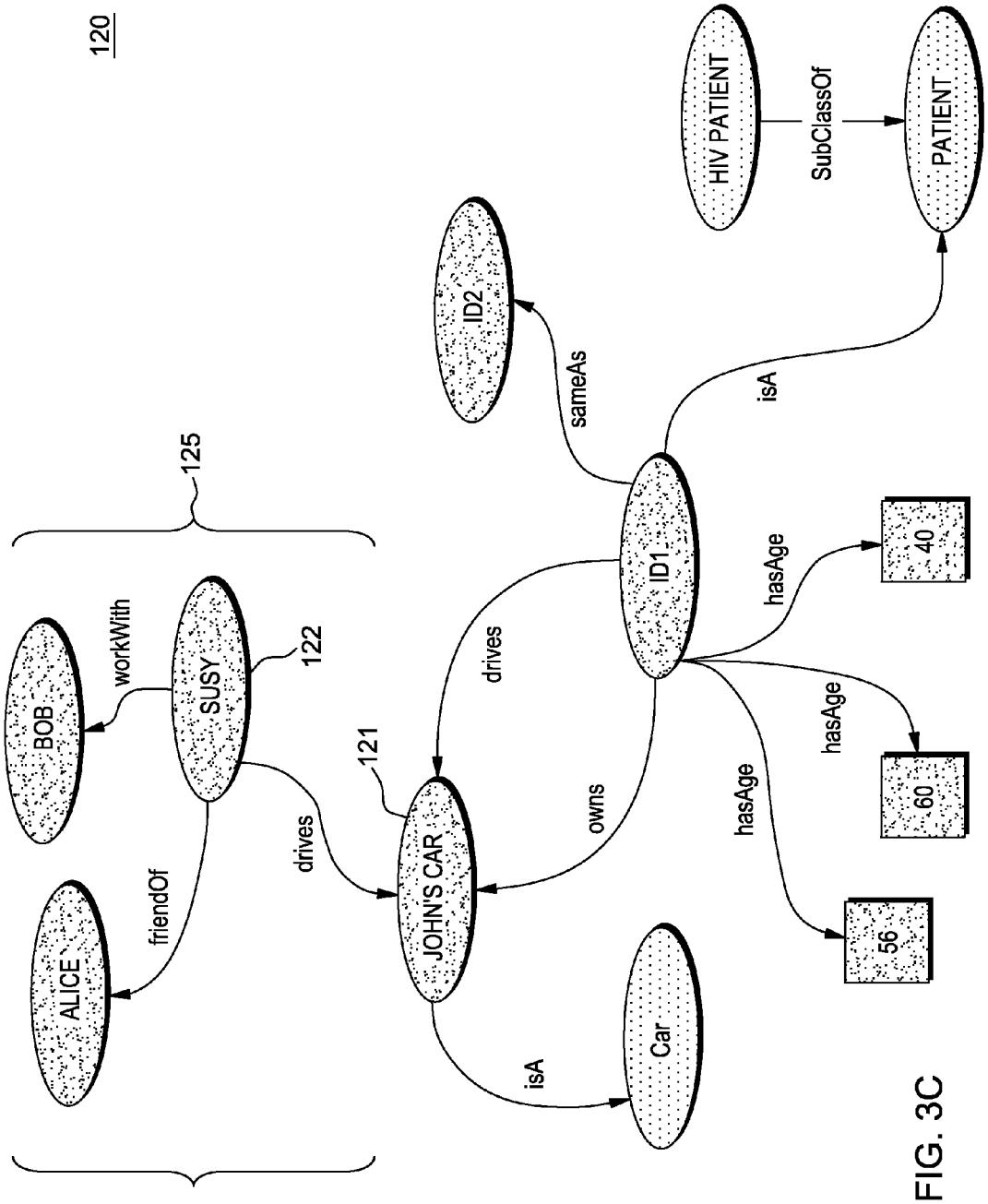
FIG. 3C depicts an example of level one expansion (r=1) for anonymized Linked Data graph of FIG. 3B.

FIG. 3C shows the example initial anonymized Linked Data graph of FIG. 3B expanded as a result of level one (r=1) iteration, creating graph 120. In this example, the URI corresponding to the node "John's car" node 121 has been dereferenced, and by doing so brings into the original graph additional information 125. The additional information is itself another Linked Data graph, and the result is an expanded graph 120.

Figure 3D:
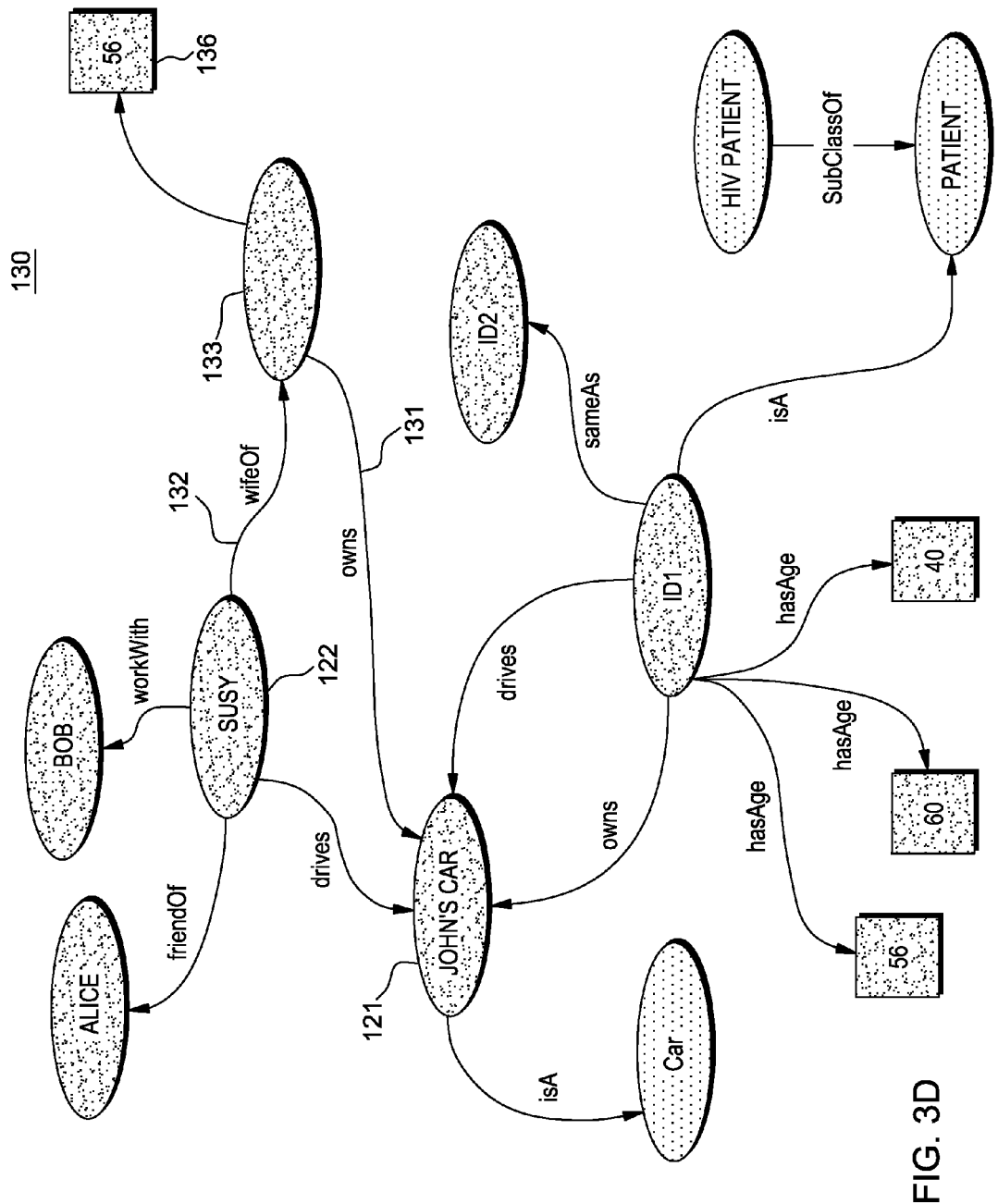
FIG. 3D depicts an example of level two expansion (r=2) for anonymized Linked Data graph of FIG. 3B.
Figure 3E:
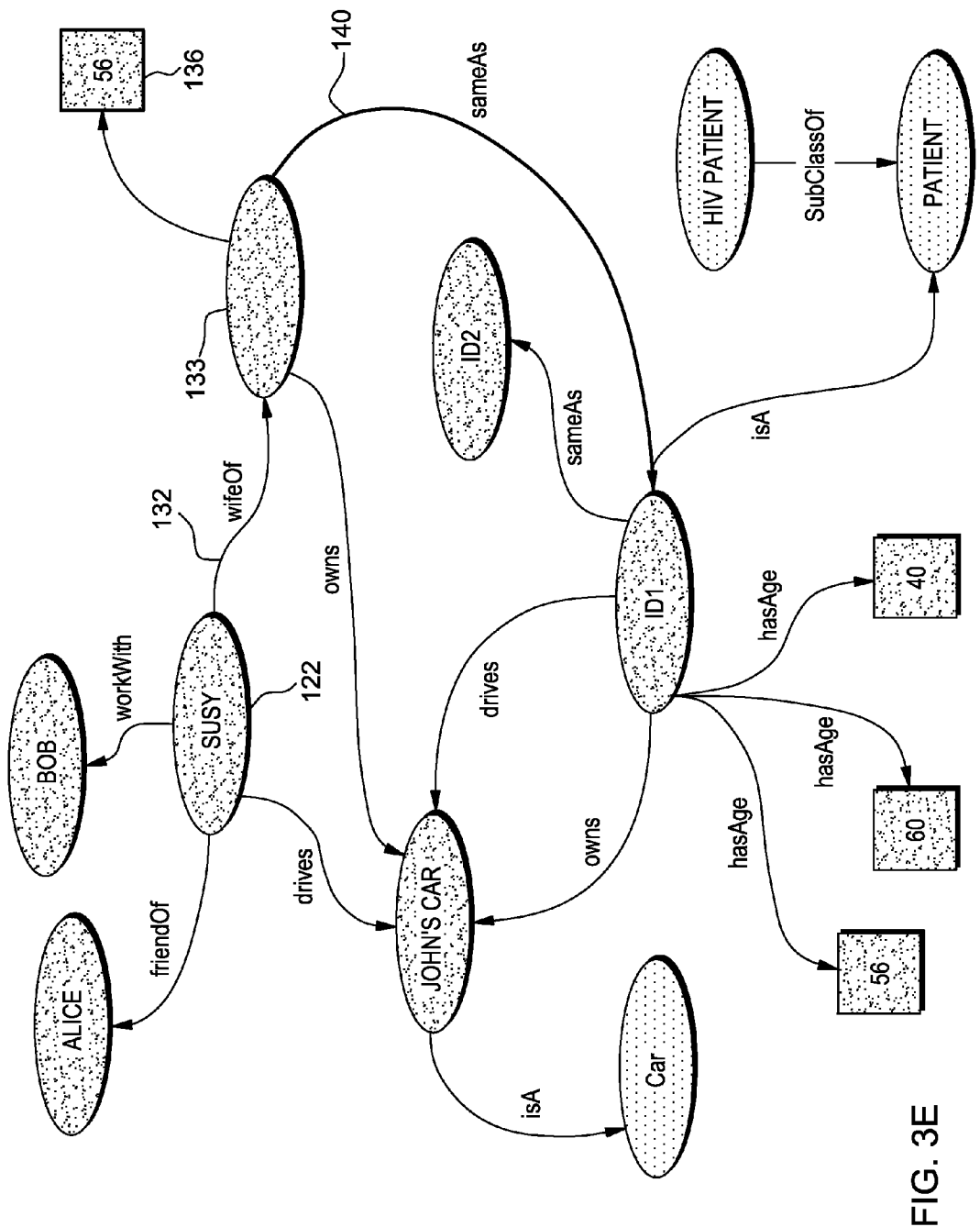
FIG. 3E depicts use of an inferred "sameAs" property that can be used to infer the real value of property "age", which breaks the anonymity.

FIG. 3D shows an example graph 130 resulting from a level two expansion (r=2) of the initial anonymized Linked Data graph $G^A$ of FIG. 3B. This graph 130 is also a level one expansion (r=1) of the graph 120 in FIG. 3C. The graph 130 in FIG. 3D is generated at the expansion step d=2 (and therefore is referred to as $G_2^A$. In this example the expansion at step d=2 breaches anonymity of node "id1" (as it discloses the actual value of property "hasAge"). This was caused by dereferencing the URI u in $G_1^A$ (FIG. 3C), corresponding to the "Susy" node 122. That is, the graph of FIG. 3D may be obtained in this example by dereferencing the URI corresponding to the node 122 in the graph 120 of FIG. 3C. This operation augments the graph with additional nodes and edges, providing additional information. In this particular example, the level two expansion breaches the anonymity of the node "id1" in the original graph by allowing disclosure of the age through inference. In fact, although the age is anonymized in the original graph $G^A$ ("id1" has multiple values of age), in the level two expansion (FIG. 3D) dereferencing the URI brings additional information in which node 122 connects via links 132 to a blank node 133 and blank node 133 is connected via property "owns" to "John's car" node 121. The blank node 133 that is found has no identifier, and it is connected with via a property "owns" (i.e., an inverse functional property) to the "John's car" node, and points to a "has Age" property of a value indicated as age 56. Since it is known from the particular ontology used in the example that "owns" 131 is an inverse-functional property, then it may be inferred that "id1" is the "sameAs" the blank node 133 as indicated as FIG. 3E via the inferred link 140, and so the actual age (56) can be inferred. As known, with respect to modeling primitive "inverse functional property" the values of properties that are declared to be inverse-functional uniquely identify the resource having the property, i.e., it is used to perform identity resolution.

As a result, since the URI u in $G_1^A$ (FIG. 3C), corresponding to the "Susy" node 122, does not belong to the initial anonymized Linked Data graph, the method searches back through the various expanded graph for the URI u* whose iterative dereferencing has originated the graph containing u. The searching back through the various expanded graph for the URI u* may be performed by SPARQL (e.g., W3C SPARQL 1.1 Query language for RDF, expressly incorporated by reference herein) commands for querying graph patterns along with their conjunctions and disjunctions. For example, after bringing in the new data in expanded graph, the SPARQL queries can be applied to attempt to obtain sensitive information. If sensitive information is obtainable, this indicates that anonymity has been breached. In this example, applying the SPARQL queries results in sets (RDF graphs) from which the URI of the node 121 ("John's car") can be traced back in anonymized Linked Data graph $G^A$ of FIG. 3B. So, in this case u*=URI of the node "John's car" in FIG. 3B (graph $G^A$); by making this URI non-dereferenceable, the expansion that breaches anonymity is avoided.

Another option is to keep this URI dereferenceable and making the property with the age value from the blank node 133 semantically equivalent to the property "hasAge" from id1, therefore, after completing the inference both equivalent instances (linked through the property sameAs), 133 and id1, point to the same "has Age" property of a value indicated as age 56, 60, 40.

As shown at 95, FIG. 2, the anonymized Linked Data graph output is generated that includes a new Linked Data graph data structure (e.g., in RDF) including the anonymized features.

Figure 5:
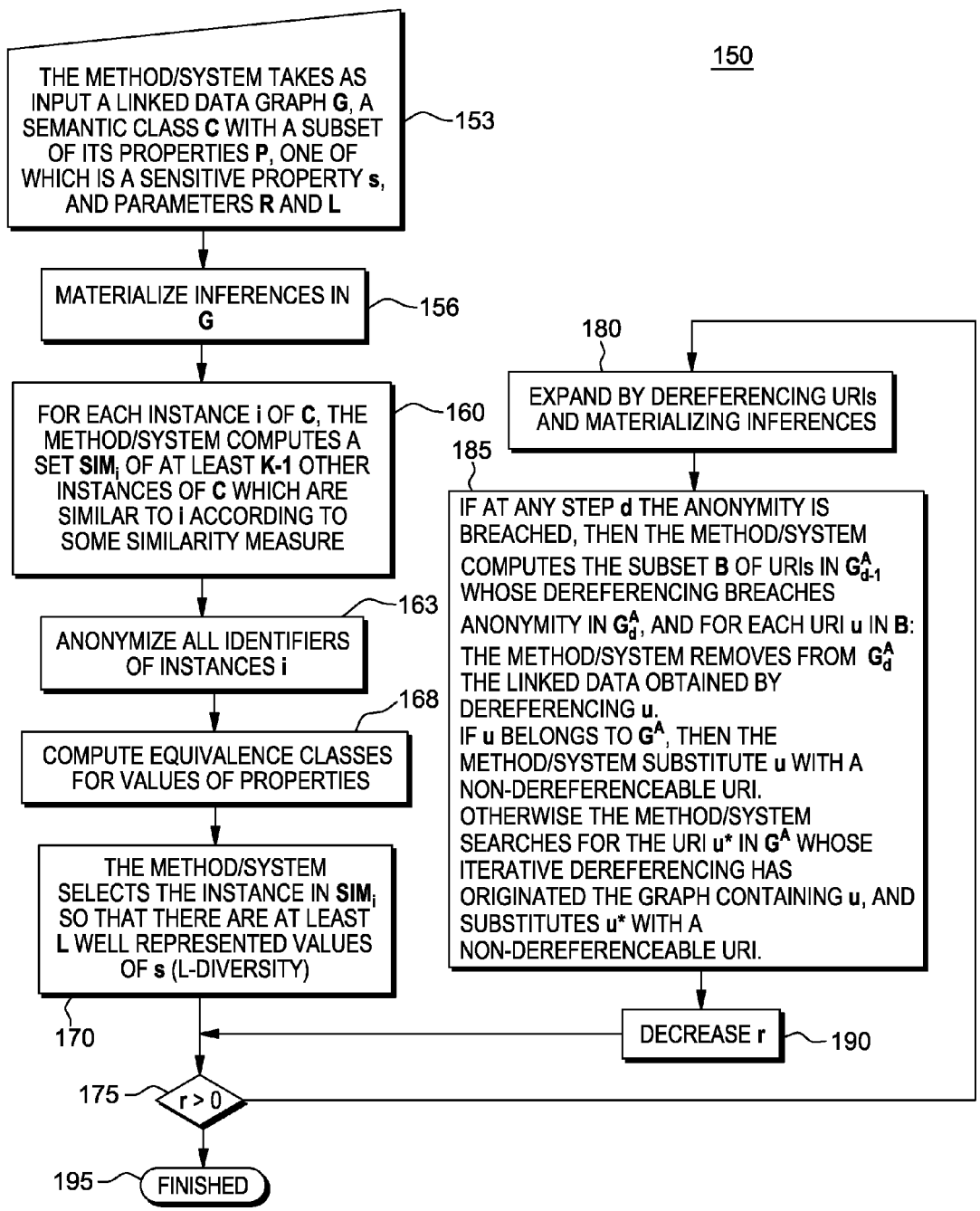
FIG. 5 shows a computer-implemented process for automatically solving the problem of anonymizing a Linked Data graph (providing l-diversity variant)

As mentioned herein above, as an alternate way of guaranteeing anonymity of Linked Data, the privacy principle of l-diversity is used. FIG. 5 shows the detailed computer-implemented process 150 for automatically solving the problem of anonymizing a Linked Data graph using the l-diversity variant, while taking into account and preserving its rich semantics, and, at the same time, ensuring that the anonymity is not breached when the Linked Data graph is expanded up to certain number of times by dereferencing its URIs (r-dereferenceability).

Particularly, the method 150 of FIG. 5 is virtually identical as the method described herein with respect to FIG. 2 with respective steps 153, 156, 160, 163, 168, 170, 175, 180, 185, 190 and 195 being programmed as methods that correspond and operate according to respective steps 53, 56, 60, 63, 68, 70, 75, 80, 85, 90 and 95 of FIG. 2. However, at the first processing step 153 in which the system receives (or accesses) inputs to the system comprising the Linked Data graph G, the (semantic) class C whose instances must be protected in the graph, and a set of properties P of C (quasi-identifying attributes), and the input parameter value r for r-dereferenceability, there is further input a specified property which is a sensitive property S. As the method further guarantees l-diversity under r-dereferenceability, then a further input includes the parameter value l for the l-diversity.

There are different types of l-diversity that can be applied to the liked data graph and the disclosure is not limited to any one in particular. Assuming, for example, that l-diversity conforms to its original definition, thereby corresponding to l different values for the sensitive property appearing in each computed equivalence class, and assuming that parameter value l is at least 2, at step 168, FIG. 5, this requires that in each produced equivalence class E, the sensitive property of the instances in C should have at least l different values. Notice that the sensitive properties are not generalized or suppressed (as is the case of properties R). To produce the equivalence classes, in the case of l-diversity, the members of each group are selected so that there is sufficient variability in the values of the sensitive attribute, i.e., the sensitive property S.

Thus, with respect to the example processing at step 168, FIG. 5, in which equivalence classes are computed for values of properties, the processing for l-diversity includes: grouping individuals (entities) at step 168 so that at least k−1 individuals that are similar to each other (with respect to the values of the quasi-identifying properties) and also adhere to the l-diversity requirement, are selected. For example, in one embodiment, a similarity measure is used to rank entities in decreasing order in terms of their similarity to an entity i based on the values of the quasi-identifying properties, and then the first m entities from this list are selected, where m is the minimum number of entities that satisfy the l-diversity requirement.

For example, considering a sensitive property S of instances in the RDF Linked Data graph, e.g., a measureable property, for example, a disease an individual may have. For the Linked Data graph, in the equivalence classes computed at step 168, there is variability in the values of this property according to the specified parameter l. For example, given an equivalence class like "Patient" the group of entities (instances or nodes) belonging to this class will have some different values of property S. For example, the number of patients chosen to be grouped together will have diverse diseases, e.g., patients grouped that do not only have a cancer, but other maladies, e.g., hypertension, diabetes, arthritis, etc. Thus, as a result of anonymizing a Linked Data graph with l-diversity, the way equivalence classes are produced and anonymity preserved changes such that no one (e.g., an adversary) will be able to accurately determine what disease a patient has.

The resulting anonymous Linked Data graph under r-dereferenceability is produced in a way that for each instance of a user-specified class, an attacker knowing the values of a set of user-specified properties of that instance in the original Linked Data graph: 1) cannot re-identify the instance with a probability greater than 1/k in the anonymous Linked Data graph (k-anonymity); and cannot learn the value of a sensitive property of that instance, because there are at least l well-represented values of that property in the anonymous Linked Data graph (l-diversity).

When considering instances of the user-specified class and properties there is also included the semantically-equivalent instances and properties which are computed through inference.

Figure 6:
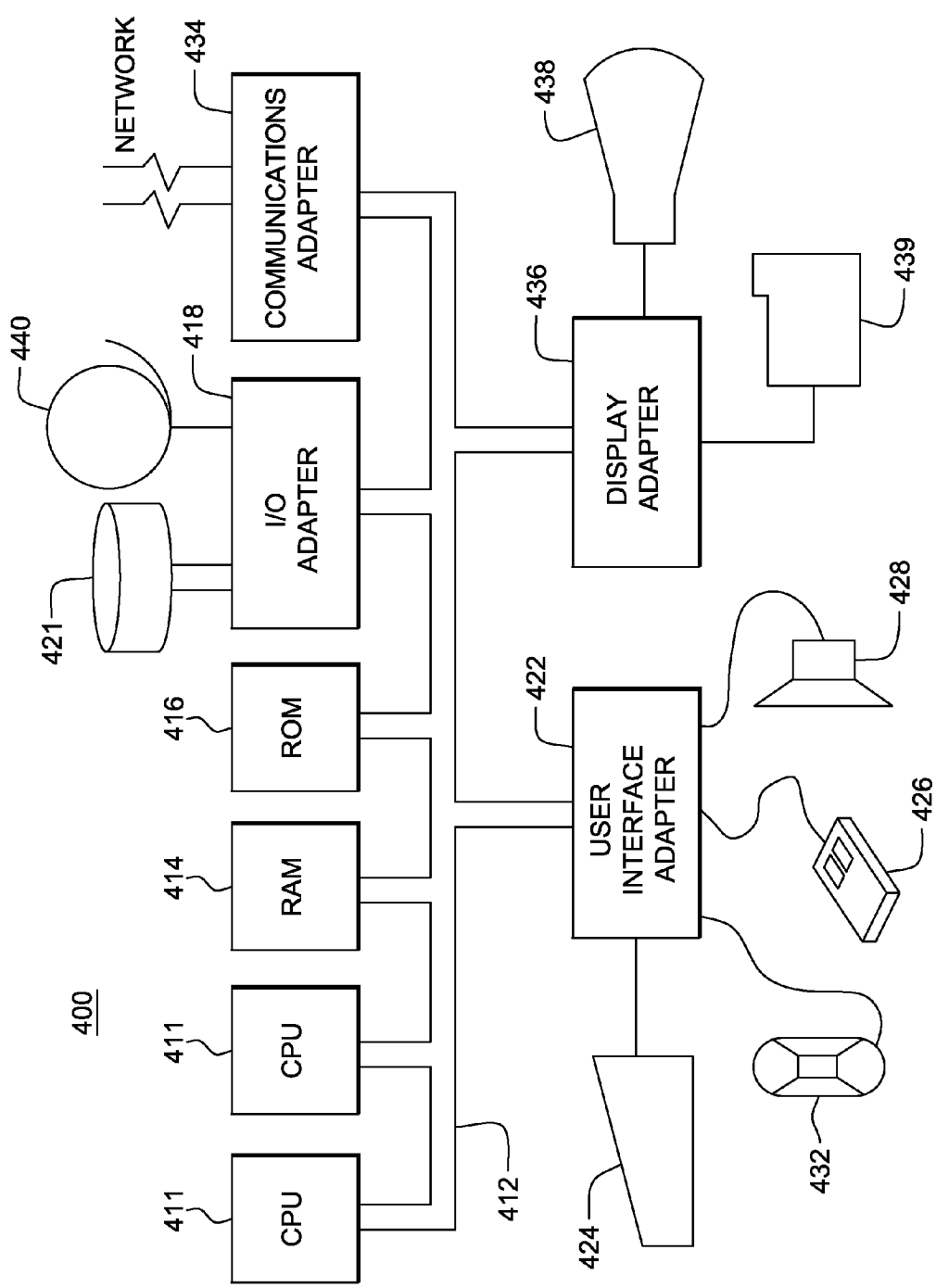
FIG. 6 illustrates a portion of a computer system, including a CPU and a conventional memory in which the present invention may be embodied.

FIG. 6 illustrates one embodiment of an exemplary hardware configuration of a computing system 400 programmed to perform the method steps described herein with respect to FIGS. 1, 2 and 5. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

The invention claimed is:

1. A computer program product to guarantee anonymity under r-dereferenceability in a Linked Data graph, the computer program product comprising:
 a storage medium, wherein said storage medium is not a propagating signal, said storage medium readable by a processing circuit and storing instructions for execution by the processing circuit for performing a method comprising:
 transforming an original Linked Data graph structure having labelled nodes interconnected by directed edges into a corresponding anonymous Linked Data graph, with one or more nodes embodying a searchable Uniform Resource Identifier (URI), and updating the corresponding ontology definitions of the Linked Data graph based on the applied transformations;
 iteratively expanding said corresponding anonymous Linked Data graph up to r times, where r is an integer >0, wherein said iteratively expanding comprises:
 dereferencing a searchable URI of a node of said anonymized Linked Data graph structure by following a link to a resource from which a further Linked Data graph structure is obtained, said further Linked Data graph structure having additional labeled nodes embodying additional searchable URIs and property values, and replacing the node embodying the searchable URI of the anonymized Linked Data graph structure with the further Linked Data graph structure to obtain an expanded Linked Data graph, and updating the corresponding ontology definitions of the expanded Linked Data graph to include the ontology definitions of the further Linked Data graph structure; and determining from each said additional URIs and property values in said expanded corresponding anonymous Linked Data graph whether anonymity is breached by searching for a URI whose iterative dereferencing originates a graph containing a Linked Data graph node URI that was present in the original Linked Data graph, and in that case making the URI determined as breaching said anonymity non-dereferenceable.

2. The computer program product as claimed in claim 1, wherein prior to said transforming, the method further comprises:

identifying all inferences or indirect relations that can be extracted from the graph nodes, and the graph nodes included in the graph through dereferencing.

3. The computer program product as claimed in claim 2, wherein said transforming comprises:

computing instances I of nodes in said Linked Data graph structure, potentially having a direct identifier to be anonymized, and quasi-identifying properties Q of nodes whose values are to be anonymized;

anonymizing all direct identifiers of instances I, changing the value of quasi-identifying properties in Q, and changing corresponding ontology definitions of said properties and instance identifiers, wherein said changing values in Q comprises:

computing equivalence classes E for quasi-identifying properties in Q; and changing values of such properties to be anonymized based on said computed equivalence classes.

4. The computer program product as claimed in claim 1, wherein said method further comprises:

identifying from said original Linked Data graph structure, one or more instances I to protect, said identified one or more instances I comprising:

a first set of said instances relating nodes of a given semantic class C that includes equivalent instances, instances of equivalent classes and instances whose inferred type is the given semantic class C, or any equivalent class; and, a second set of instances that are connected through an inverse functional property to any instance in said instances first set; and extracting said instances I to be protected.

5. The computer program product as claimed in claim 1, further comprising:

identifying, by said computer system, from said original Linked Data graph structure, one or more properties Q to collectively protect, said identified one or more properties Q comprising:

properties that are inferred to be equivalent to any property given in an input set of properties P of said original Linked Data graph structure.

6. The computer program product as claimed in claim 5, wherein said protecting one or more properties Q comprises:

for each instance i of a given semantic class C:

compute a set $Sim_i$ of a plurality of at least k−1 other instances of said semantic class C which are similar to instance i according to a similarity measure S, said identifying of properties Q further considering a semantic class C and properties in said set P and semantically-equivalent instances and properties computed through inference, wherein said transforming comprises one of:

assigning the same generalized value to each property in set P for each instance in said set $Sim_i$ (produced equivalence class), or suppressing a property for all instances in said set $Sim_i$, wherein said corresponding anonymous Linked Data graph exhibits k-anonymity.

7. The computer program product as claimed in claim 5, wherein said protecting one or more properties Q comprises:

for each instance i of a given semantic class C:

compute a set $Sim_i$ of a plurality of at least k−1 other instances of said semantic class C which are similar to instance i according to a specified similarity measure S, said identifying of properties Q further considering a semantic class C and properties in said set P and semantically-equivalent instances and properties computed through inference, wherein said transforming comprises one of:

selecting the instances in $Sim_i$ that results in at least l well represented values of related instances based on said specified similarity measure S, wherein said corresponding anonymous Linked Data graph exhibits k-diversity.

8. The computer program product as claimed in claim 1, wherein if said anonymity is breached, said dereferencing comprises:

computing a subset of URIs in said expanded corresponding anonymized Linked Data graph whose dereferencing breaches anonymity, and for each URI u in said subset, removing from said expanded corresponding anonymized Linked Data graph the Linked Data obtained by dereferencing said URI u; and determining if URI u belongs to the corresponding anonymous Linked Data graph, and substituting URI u with a non-dereferenceable URI if determined that the dereferencing u belongs to the transformed corresponding anonymous Linked Data graph.

9. A system to guarantee anonymity under r-dereferenceability in a Linked Data graph comprising:

a memory storage device;

a processor unit in communication with said memory storage device and configured to perform a method to:

transform an original Linked Data graph structure having labeled nodes interconnected by directed edges into a corresponding anonymous Linked Data graph, with one or more nodes embodying a searchable Uniform Resource Identifier (URI), and updating the corresponding ontology definitions of the Linked Data graph based on the applied transformations;

iteratively expand said corresponding anonymous Linked Data graph up to r times, where r is an integer >0, wherein said to iteratively expand, the processor unit is further configured to:

dereference a searchable URI of a node of said anonymized Linked Data graph structure by following a link to a resource from which a further Linked Data graph structure is obtained, said further Linked Data graph structure having additional labeled nodes embodying additional searchable URIs and property values, and replace the node embodying the searchable URI of the anonymized Linked Data graph structure with the further Linked Data graph structure to obtain an expanded Linked Data graph, and update the corresponding ontology definitions of the expanded Linked Data graph to include the ontology definitions of the further Linked Data graph structure; and determine from each said additional URIs and property values in said expanded corresponding anonymous Linked Data graph whether anonymity is breached searching for a URI whose iterative dereferencing originates a graph containing a Linked Data graph node URI that was present in the original Linked Data graph, and dereference a URI determined as breaching said anonymity.

10. The system as claimed in claim 9, wherein said processor unit is further configured to:

identify from said original Linked Data graph structure, one or more properties Q to collectively protect, said identified one or more properties Q comprising:

properties that are inferred to be equivalent to any property given in an input set of properties P of said original Linked Data graph structure.

11. The system as claimed in claim 9, wherein to protect one or more properties Q, said processor unit is further configured to:

for each instance i of a given semantic class C:

compute a set $Sim_i$ of a plurality of at least k−1 other instances of said semantic class C which are similar to instance i according to a similarity measure S, said identifying of properties Q further considering a semantic class C and properties in said set P and semantically-equivalent instances and properties computed through inference, wherein to transform, said processor unit is configured to perform one of:

assigning the same generalized value to each property in set P for each instance in said set $Sim_i$ (produced equivalence class), or suppressing a property for all instances in said set $Sim_i$, wherein said corresponding anonymous Linked Data graph exhibits k-anonymity.

12. The system as claimed in claim 9, wherein to protect one or more properties Q, said processor unit is further configured to:

for each instance i of a given semantic class C:

compute a set $Sim_i$ of a plurality of at least k−1 other instances of said semantic class C which are similar to instance i according to a specified similarity measure S, said identifying of properties Q further considering a semantic class C and properties in said set P and semantically-equivalent instances and properties computed through inference, wherein to transform, said processor unit is configured to:

select the instances in $Sim_i$ that results in at least l well represented values of related instances based on said specified similarity measure S, wherein said corresponding anonymous Linked Data graph exhibits l-diversity.

13. The system as claimed in claim 9, wherein to transform, said processor unit is further configured to:

compute instances I of nodes in said Linked Data graph structure, potentially having a direct identifier to be anonymized, and quasi-identifying properties Q of nodes whose values are to be anonymized;

anonymize all direct identifiers of instances I, change the value of quasi-identifying properties in Q, and change corresponding ontology definitions of said properties and instance identifiers, wherein said changing values in Q comprises:

compute equivalence classes E for quasi-identifying properties in Q; and change values of such properties to be anonymized based on said computed equivalence classes.

* * * * *